Dec. 12, 1961     A. B. BAKER     3,012,566
WASHING APPARATUS FOR MILKING MACHINE INFLATIONS
Filed Aug. 5, 1957     2 Sheets-Sheet 1

INVENTOR
ARCHIE B. BAKER
BY
Freese & Bishop
ATTORNEYS

Dec. 12, 1961 A. B. BAKER 3,012,566
WASHING APPARATUS FOR MILKING MACHINE INFLATIONS
Filed Aug. 5, 1957 2 Sheets-Sheet 2
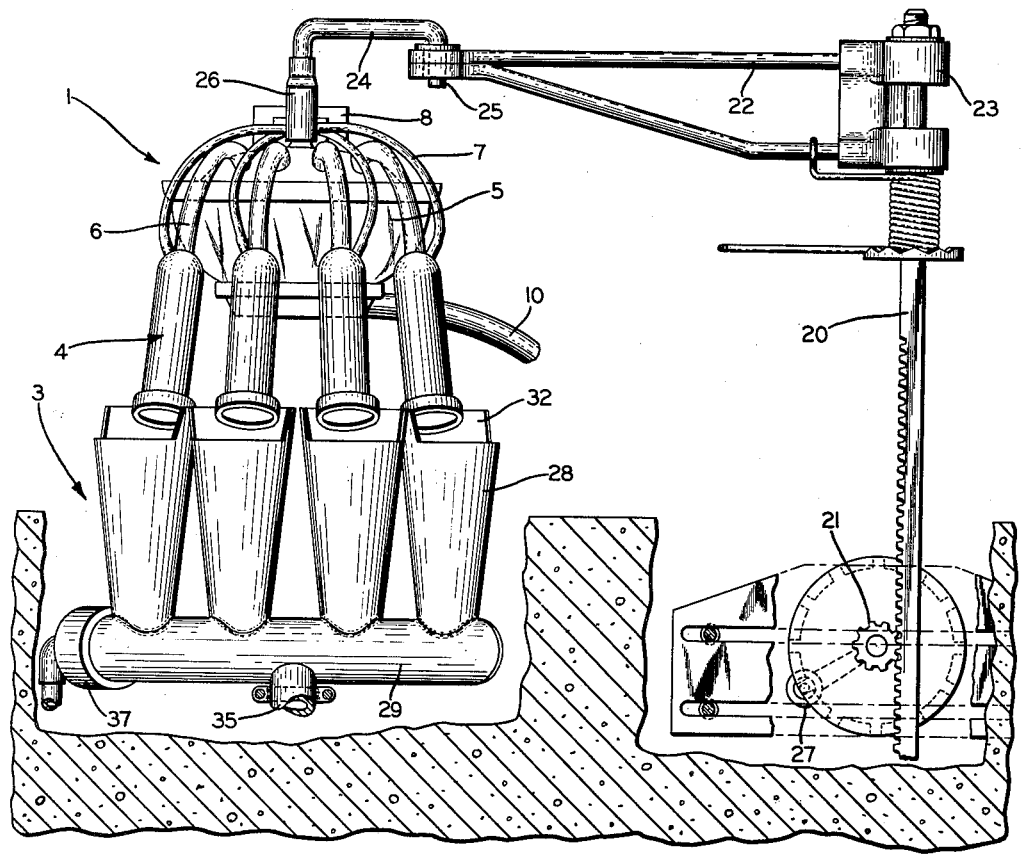
FIG. 2
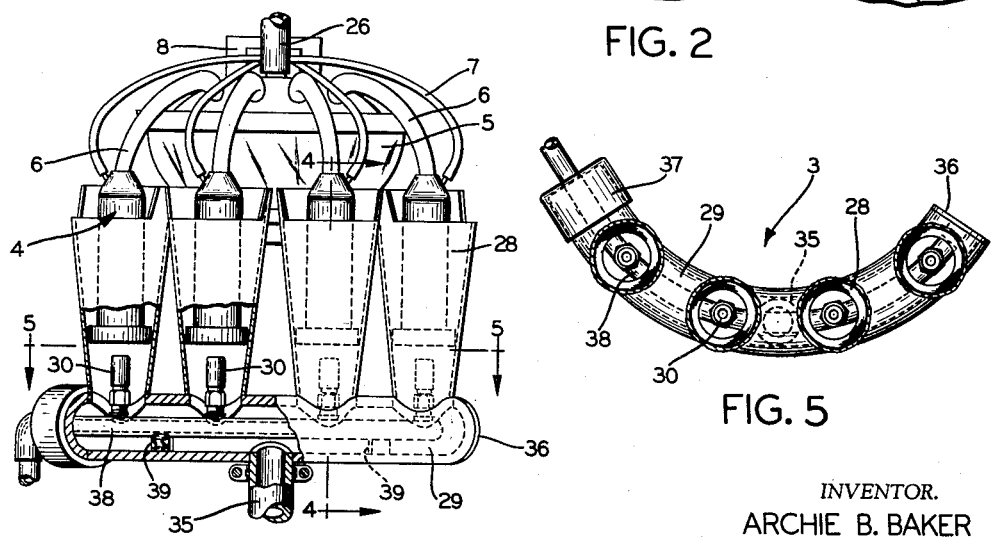
FIG. 3
FIG. 5
INVENTOR.
ARCHIE B. BAKER
BY *Frease & Bishop*
ATTORNEYS

United States Patent Office 3,012,566
Patented Dec. 12, 1961

3,012,566
WASHING APPARATUS FOR MILKING
MACHINE INFLATIONS
Archie B. Baker, 2955 Westmoreland Road NW.,
Canton, Ohio
Filed Aug. 5, 1957, Ser. No. 676,242
3 Claims. (Cl. 134—152)

This invention relates to a device for cleaning inflations of a milking machine.

Automatic milking machines are provided with preferably four inflations or teat cups. In order to maintain satisfactory sanitary conditions it is desirable to clean the inflations after milking each cow. Such practice minimizes the transfer of any dirt or possible disease from one cow to another.

Various devices have been proposed for cleaning inflations of milking machines. The devices, however, have not been universally accepted for various reasons. First, the prior devices have not provided sealing support means for the milking machine inflations during the cleaning operation. Such devices rather have supported inflations at their lower ends with spray nozzles telescoped within the inflations, thereby washing the interior of the inflation but not the outer end.

Moreover, none of the prior devices have provided separate conical funnel housings to permit sealing between the housing and the periphery of the inflation. Nor have such devices included means for locating the inflations without additional and separate handling. Furthermore, none of the prior devices have a curved or arcuate arrangement for the washing housings in which the inflations are more easily inserted. As a result of the foregoing disadvantages there has been a need for an apparatus for washing inflations which facilitates the insertion of inflations into separate housings in which inflations are mounted so that all surfaces of the inflations that contact a cow are washed between each milking operation.

The device of the present invention provides a positive means for facilitating the insertion of inflations prior to their washing, for washing all surfaces of an inflation which contact a cow, and for sealing said surfaces within a washing zone of the device during such washing operation.

Generally, it is an object of this invention to provide means for washing all critical surfaces of an inflation of a milking machine.

It is another object of this invention to provide a washing device for milking machine inflations which facilitates the insertion of the inflations into the device.

It is another object of this invention to provide a device for washing inflations in which the inflation is sealed by peripheral contact with the washer housing during the washing operation.

Finally, it is an object of this invention to provide a washer for inflations of a milking machine by which the described difficulties are overcome and the foregoing objects and desiderata are obtained in a simple, effective, and inexpensive manner.

These and other objects and advantages apparent to those skilled in the art from the following description and claims may be obtained, the stated results achieved and the described difficulties overcome by the discoveries, principles, apparatus, parts, combinations, subcombinations, and elements which comprise the present invention, the nature of which is set forth in the following statement, a preferred embodiment of which— illustrative of the best mode in which applicant has contemplated applying the principles—is set forth in the following description, and which is particularly and distinctly pointed out and set forth in the appended claims forming part hereof.

The nature of the apparatus of the present invention may be stated in general terms as including a plurality of funnel-shaped members for separately receiving inflations of a milking machine, the lower ends of the funnel members being attached to and communicating with a preferably arcuate-shaped manifold, each funnel having a water spray nozzle disposed at the lower end and a water supply pipe extending through the manifold and connected to each spray nozzle, the spray nozzles being so spaced from the lower ends of the inflations when inserted in their respective funnel members that the entire surface of the inflation which contacts a cow is sprayed by water issuing from the nozzle. The periphery of the inflation provides a fluid seal contact with the inner surface of the funnel during the spraying operation. Finally, the upper end of each funnel includes an upwardly extending flange which facilitates alignment of the inflations separately with the upper openings of the funnel members.

An embodiment of the invention is illustrated, by way of example, in the accompanying drawing, wherein:

FIG. 2 is an elevational view showing the milking machine above the washing apparatus and showing the position of each inflation in alignment with a washing funnel prior to lowering the inflations into the funnels;

FIG. 3 is an elevational view, partly broken away, showing the inflations completely inserted within their respective funnels after being lowered from the position of FIG. 2;

FIG. 4 is a vertical sectional view taken on the line 4—4 of FIG. 3; and

FIG. 5 is a horizontal sectional view taken on the line 5—5 of FIG. 3.

Similar numerals refer to similar parts throughout the several views of the drawings.

Figure 1:
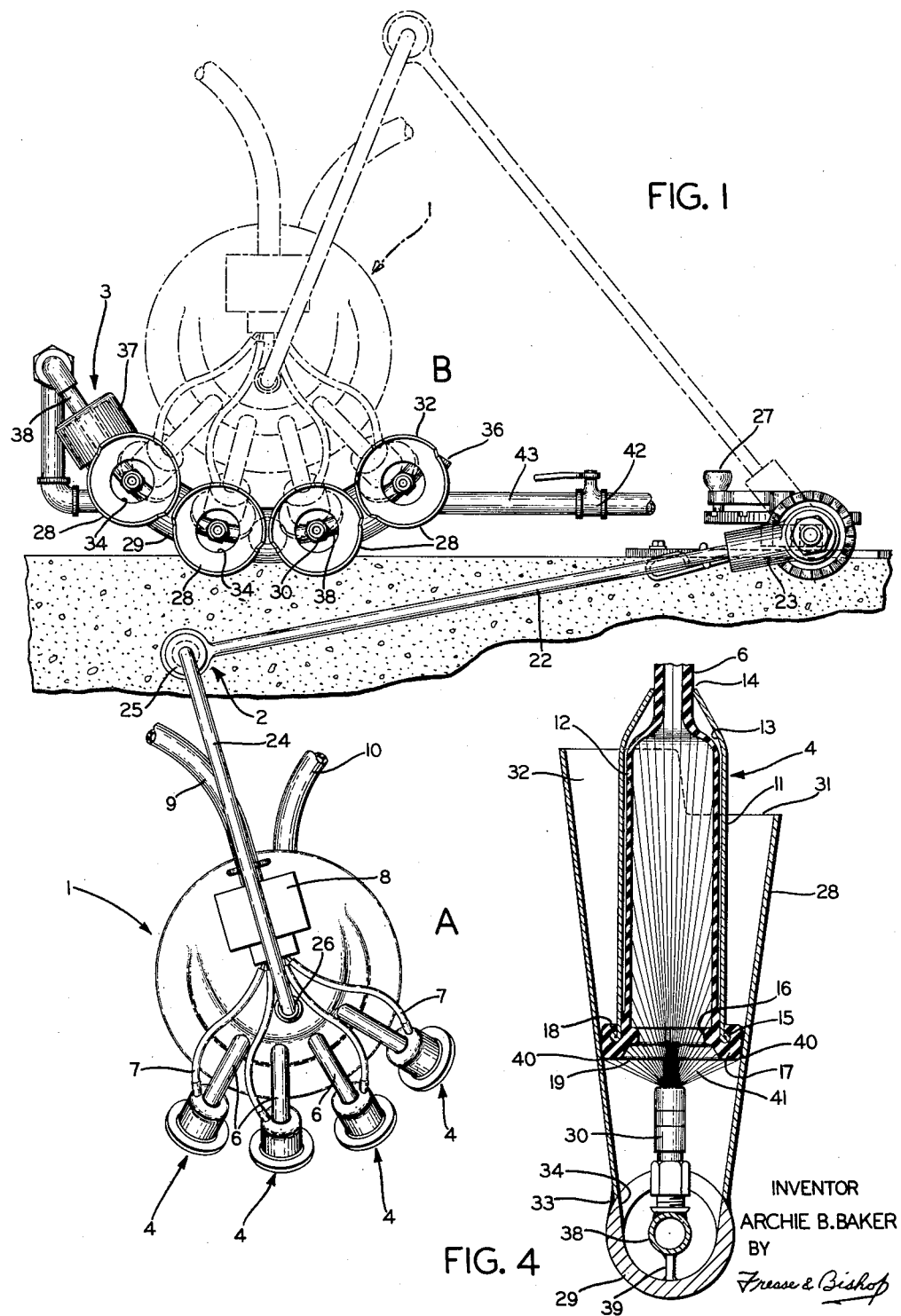
FIGURE 1 is a plan view of a milking machine movable between a milking position A (in solid lines) and a washing position B (in broken lines) above the washing apparatus.

In FIG. 1 an automatic milking machine generally indicated at 1 is mounted on a support arm generally indicated at 2. The milking machine 1 is movable between positions A and B. At position A the milking machine 1 is located for milking a cow and at position B the milking machine is located for washing by a washing apparatus generally indicated at 3.

The automatic milking machine 1 includes four teat cups generally indicated at 4 which are similar in construction and which are connected to a milk-receiving bowl 5 (FIG. 2) by flexible tubes 6. Other tubes 7 also lead from the teat cups 4 to an air pulsator 8 located at the top of the milking machine 1. An air suction tube 9 extends from the pulsator 8 to a source of air suction such as a vacuum pump (not shown). A milk tube or line 10 extends from the lower portion of the bowl 5 to a milk storage container (not shown).

Each teat cup 4 includes an outer metal casing 11 and a flexible liner or inflation 12 separated from the inner surface of the casing by a space 13 as shown in FIG. 4. The upper end of the casing is provided with an opening 14 and the lower end of the casing includes a beaded edge 15.

The flexible liner or inflation member 12 is a substantially cylindrical member, in which a cow teat is inserted for milking. The upper end of the inflation 12 may include the tube 6. The lower end of the inflation 12, as shown in FIG. 4, includes a radially inturned flange 16, a thickened or enlarged end portion 17, and a backturned flange 18 adapted to surround the bead 15 of the casing 11. The enlarged end portion 17 together with the inturned flange 16 provides an outturned end surface 19 that contacts the udder of a cow during the milking operation.

As shown in FIGS. 1 and 2, the support arm 2 includes an upright rack 20 operatively connected to a pinion gear 21, a horizontal arm member 22 rotatably mounted at 23 on the upper end of the upright rack 20, and a horizontal arm member 24 rotatably mounted at one end 25 on the arm member 22 and supporting the milking machine 1 at the other end 26. The support arm 2 is movable vertically by rotation of the gear 21 by a crank 27 and horizontally between the milking position A shown in full lines in FIG. 1, and the washing position B shown in dot-dash lines in FIG. 1 and in full lines in FIG. 3.

The milking machine 1 is suspended at all times from the support arm 2. The vertical location of the milking machine may be adjusted by movement of the rack 20 to locate the teat cups 4 at the proper distance above the floor level required for milking any particular cow. The vertical location of the teat cups 4 when hanging from the milking machine 1 may also be adjusted by movement of the rack 20 to raise or lower the cups 4 from or into the washing apparatus 3.

Lateral movement of the milking machine 1 between a position adjacent the cow and a position above the washing apparatus 3 is provided by swinging movement of the arm members 22 and 24.

The milking machine 1 is generally located quite close to the floor level when in milking position A with the teat cups 4 upturned and attached to the cow. This position may be adjusted vertically by movement of the rack 20 to suit the location of the udder of any particular cow.

When a milking operation is completed, the teat cups 4 are detached from the cow and to avoid dragging the downwardly hanging cups 4 on the floor, the milking machine may be raised by movement of the rack 20 at the same time that it is swung laterally away from the cow toward the washing apparatus 3 by swinging movement of the arm members 22 and 24. As the milking machine 1 is swung toward the washing apparatus, the vertical location of the hanging teat cups 4 is adjusted by manipulation of the rack 20 until the lower ends of the teat cups 4 are just above the level of the notched upper ends of the funnels 28 of the washing apparatus 3. This permits the milking machine to be swung to the dot-dash position shown in FIG. 1, also shown in full lines in FIG. 2, above the washing apparatus.

The washing apparatus 3 includes four upright funnels 28, a manifold 29, and spray nozzles 30. The funnels 28 are conically shaped members having downwardly and inwardly tapered surfaces. The upper end of each funnel 28 is larger and notched at 31 and provided with an upright flange 32 that extends substantially in a semicircle around the upper end. The flanges 32 facilitate the location of the teat cups 4 above the funnels when the milking machine 1 is moved from position A to a position above the washing apparatus. As the milking machine 1 swings to this position (FIG. 2), the lower ends of the teat cups 4 contact the flange portions 32 and are then ready for lowering into the funnels 28 by rotation of the crank 27 from the position of FIG. 2 to the washing position B of FIG. 3.

The lower end of each funnel 28 is welded at 33 to the manifold 29 having equally spaced apertures 34 (FIGS. 1 and 4). The funnels 28 communicate with the interior of the manifold 29.

The manifold 29 includes a drain conduit 35 by which wash water is drained during the washing operation. Opposite ends of the manifold 29 are closed by closure means 36 and 37 and a wash water conduit 38 extends through the closure means 37 into the manifold 29 and is preferably coaxially disposed therein. Support blocks 39 maintain the conduit 38 rigidly in place with respect to the manifold 29.

The four nozzles 30 are connected to the conduit 38 at intervals equal to the spacing between the apertures 34 in the manifold 29 so that each nozzle 30 extends upwardly from and is supported by the conduit 38 with the upper end of each nozzle 30 disposed within the lower portion of the funnel 28. In addition, each nozzle 30 is coaxially located with respect to the funnel axis. Accordingly, the inflations 12 are automatically centered in the funnels 28 and over the nozzles 30 when lowered into the funnels.

Inasmuch as the teat cups 4 are arcuately disposed around one side of the milking machine 1, the manifold 29 also has the same arcuate shape. Moreover, the funnels 28 are spaced from each other by a distance substantially equal to the spacing of the teat cups 4 as they hang from the milking machine. This construction together with the flange portion 32 of the funnels 28 enables the proper location and alignment of the teat cups 4 with the funnels as the milking machine 1 is swung away from the cow to the washing position without any separate handling or manipulation.

In operation, after milking is complete the machine 1 is swung outwardly and upwardly from below a cow until the teat cups 4 are located above the funnels 28, as shown by the dotted position B in FIG. 1. The milking machine 1 is then lowered from the position of FIG. 2 to that of FIG. 3 until the backturned flanges 18 of the inflations 12 are seated in peripheral sealing contact at 40 with the downwardly and inwardly tapered surfaces of the funnels 28. In this position, as shown in FIG. 4, the nozzles 30 are spaced below the inflations 12 and the inflations are supported in sealing contact within the funnel. By providing a sealed contact at 40 between the inflations and the funnels, the subsequent spraying operation may be performed with the water spray 41 confined inside of the funnels 28. Moreover, by providing the sealed contact at 40, the peripheral portion only of each inflation 12 is supported in the funnel during the washing operation. Thus, all surfaces of the inflation including surface 19 are exposed to and sprayed by the upwardly flaring spray 41 from the nozzles 30 spaced below the inflations for washing.

After the inflations 12 are seated and sealed in the funnel 28, water is turned on at a valve 42 in a water line 43 connected to the conduit 38. The resulting water spray 41 squirts upwardly and outwardly to wash all surfaces of the inflation 12, including the inside portion, the radial flange 16, and the outer surface 19 extending from the flange 16 to the contact point 40 at the inner surface of the funnel 28. Accordingly, all surfaces of the inflation 12 which contact a cow are thoroughly washed.

During the washing operation the wash water drops or drains from the sprayed surfaces of the inflation 12 downwardly into the manifold 29 through the opening 34 from which it flows through the drain conduit 35.

As is shown in FIG. 4, the outer ends of the several inflations 12 include a wide surface 19 which contacts a cow's udder around a teat which extends into the inflation member 12 beyond the flange 16. Any disease or dirt which may be on one cow would be transferred to another cow if all cow-contacting surfaces including the lower surface 19 were not washed between each milking operation. For this reason it is necessary for complete washing of such surfaces that the inflations 12 be supported around their peripheries at 40 rather than at their undersurfaces as with prior washing devices for teat cups of milking machines. By locating the spray nozzles below rather than within the inflations the entire surface of each inflation is exposed to the water spray 41. All possible infected or dirty portions of the inflation are thereby washed and ready for subsequent contact with another cow for milking.

Among other things, the foregoing construction includes a structure in which four conical funnel housings are disposed in an arcuate arrangement that cooperates with the arrangement of the teat cups in the inoperative position. Each funnel housing includes an upper flange for contacting and aiding location of the teat cups with the funnel housings and upon lowering the teat cups are centered by the funnel housings with respect to the coaxially disposed spray nozzles and seated in sealing contact with the inner surfaces of the funnel housings, thereby confining the water within each housing. No surfaces of the inflations which contact the cow are left unexposed to the water spray of the nozzles and thereby the entire cow-contacting surface of each inflation is exposed to water spray washing.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown.

Having now described the features, constructions and principles of the invention, the characteristics of the new washing apparatus for milking machine inflations, and the advantageous, new and useful results provided; the new and useful discoveries, principles, parts, elements, combinations, subcombinations, structures and arrangements, and mechanical equivalents obvious to those skilled in the art are set forth in the appended claims.

I claim:

1. Washing apparatus for the inflations of an automatic milking machine of the type in which a plurality of inflations are suspended and flexibly hang from a milk-receiving bowl, in which the bowl and inflations are mounted adjacent a milking stall above the stall floor and are movable laterally between a milking position where the inflations may be connected with the teats of a cow and a washing position where the inflations may be cleaned, in which the milking bowl and inflations may be raised and lowered at either position and during lateral movement between positions to adjust their location relative to the stall floor and the cow being milked and to place the plurality of inflations in and remove them from cleaning position, in which each inflation includes a flexible substantially cylindrical member open at one end for insertion therein of a cow teat during milking, in which said one flexible inflation member end includes an enlarged and thickened portion having an inner circumferential surface, an outer circumferential surface spaced from said inner surface and an end surface connecting the inner and outer surfaces, and in which the interior of the inflation and the inner circumferential surface and the end surface of the enlarged inflation member end portion contact the teat and udder of a cow during a milking operation; said washing apparatus including, a manifold located adjacent the milking stall at the washing position having an upper wall provided with a plurality of spaced openings equal in number to the number of flexibly hanging milking machine inflations, a hollow inflation-receiving member extending upwardly from each manifold opening, each inflation-receiving member being open and notched at its upper end to provide an upright flange extending part way around its open upper end, said flange comprising an upwardly disposed continuation in the same plane of the inflation-receiving member, an intermediate portion of the inner circumferential surface of the inflation-receiving member being of the same size and shape as the outer circumferential surface of the enlarged portion of the inflation, the hanging inflations when moved laterally to the washing position engaging said upright flanges to locate the inflations above said receiving members, the outer circumferential surfaces of the enlarged inflation end portions of the hanging inflations when so located above the receiving members and upon lowering the inflations at the washing position engaging and sealing against with intermediate portions of the inner circumferential surfaces of their respective inflation-receiving members, the entire end surfaces of the enlarged inflation end portions being downwardly exposed within the receiving members when so engaged with and sealed against said receiving members, spray nozzle means in the manifold extending upwardly through each manifold opening into the lower end of each receiving member, and the nozzle of each said spray nozzle means being located within each receiving member below the lower end of the respective exposed inflation member end surface when the enlarged inflation end portions are seated in said receiving members so that said spray nozzles will direct sprays against the entire end surfaces of the inflations; whereby the hanging inflations may be automatically inserted and sealed within the receiving members by mere manipulation of the milking machine without separate handling and manipulation of the inflations, and whereby the inflation member and enlarged end portion surfaces which contact the teat and udder of a cow during a milking operation then may be thoroughly washed upon actuation of the spray nozzle means.

2. The construction defined in claim 1 in which the inflations are suspended and flexibly hang from the milking machine milk-receiving bowl in a generally vertically extending arcuate zone, and in which the hollow inflation-receiving members are arranged in a generally vertically extending arcuate zone corresponding to the shape of said arcuate zone of the flexibly hanging inflations.

3. The construction defined in claim 1 in which the inner circumferential surfaces of the inflation-receiving members with which the enlarged inflation end portions are engaged and sealed are downwardly and inwardly tapered surfaces.

References Cited in the file of this patent

UNITED STATES PATENTS

| | | |
|---|---|---|
| 426,165 | Brittin | Apr. 22, 1890 |
| 1,213,445 | Altpeter | Jan. 23, 1917 |
| 1,358,218 | Kosminsky | Nov. 9, 1920 |
| 1,758,537 | Rakestraw | May 13, 1930 |
| 1,766,208 | Anstiss | June 24, 1930 |
| 2,078,860 | Landis | Apr. 27, 1937 |
| 2,162,228 | Peirce | June 13, 1939 |
| 2,228,520 | Hodson | Jan. 14, 1941 |
| 2,404,286 | Graham | July 16, 1946 |
| 2,493,291 | Hirsch | Jan. 3, 1950 |
| 2,786,479 | Dungfelder | Mar. 26, 1957 |
| 2,874,656 | Bennett | Feb. 24, 1959 |
| 2,893,648 | Berry | July 7, 1959 |

FOREIGN PATENTS

| | | |
|---|---|---|
| 21,914/29 | Australia | Aug. 19, 1929 |